3,373,000
PROCESS FOR PREPARING TETRAFLUORIDES
AND HEXAFLUORIDES
James J. Pitts, West Haven, and Albert W. Jache, North Haven, Conn., assignors to Olin Mathieson Chemical Corporation, a corporation of Virginia
No Drawing. Filed Nov. 1, 1966, Ser. No. 591,079
9 Claims. (Cl. 23—352)

ABSTRACT OF THE DISCLOSURE

The tetrafluorides and hexafluorides of sulfur, selenium and tellurium are provided by reacting chlorine monofluoride with sulfur, selenium, tellurium, metal sulfides, metal selenides or metal tellurides. The hexafluorides of tungsten, molybdenum and uranium are provided by the reaction of chlorine monofluoride with the metals, their oxides, sulfides and salts containing the metallate anion. These tetrafluorides and hexafluorides are well-known compounds, useful as fluorinating agents, gaseous dielectrics, sources of high purity metallic powders, etc.

---

This invention relates to a process for preparing the tetrafluorides and hexafluorides of sulfur, selenium and tellurium by the reaction of chlorine monofluoride with the elements sulfur, selenium and tellurium and with the metal sulfides, selenides and tellurides. It also relates to a process for preparing the hexafluorides of tungsten, molybdenum and uranium by the reaction of chlorine monofluoride with the metals, their oxides, sulfides and salts containing the metallate anion.

The tetrafluorides and hexafluorides of sulfur, selenium, tellurium, tungsten, molybdenum and uranium have been previously prepared and described in the literature. For example, D. Yost and W. Calusen in J. Am. Chem. Soc., 55,-885 (1933) discloses the reaction of sulfur and selenium with elemental fluorine to provide sulfur tetrafluoride, sulfur hexafluoride, selenium tetrafluoride and selenium hexafluoride, while the reaction of tellurium with fluorine to provide tellurium hexafluoride is reported by H. Moissan and P. Lebeau in Compt. Rend., 130, 965 (1900). Fluorifluorine to provide the respective hexafluorides is described by Edwards et al., J. Chem Soc. 4486, (1962). However, elemental fluorine is costly, corrosive and difficult to handle. Furthermore, it is such a vigorous fluorinating agent that stringent process conditions are essential, thereby hindering efficient commercial operations.

It is also known to prepare various tetrafluorides and hexafluorides employing chlorine trifluoride as the fluorinating agent. For instance, F. Nyman and H. Roberts in J. Chem. Soc., 3180, (1962) report the reaction of sulfur with chlorine trifluoride to provide sulfur tetrafluoride. The efficacy of chlorine trifluoride as a fluorinating agent is attributed to the highly oxidized state of the chlorine, which readily releases fluorine, making it available to react with the metal to form the tetrafluoride. However, chlorine trifluoride is such a powerful fluorinating agent that cumbersome process controls such as dilution with inert gases or cooling to the liquid state are necessary. Furthermore, chlorine trifluoride is synthesized from elemental fluorine and chlorine, and therefore processes employing it as a fluorinating agent are uneconomical.

Now it has been found that chlorine monofluoride unexpectedly acts as a selective fluorinating agent over a wide temperature range and in the presence of a variety of metals. Furthermore, it is readily utilized in its gaseous state without dilution or other process controls, thereby obviating the above-mentioned difficulties encountered when chlorine trifluoride is employed in the preparation of metal tetrafluorides and metal hexafluorides. Chlorine monofluoride is also an economical reactant, since it is conveniently prepared by the disproportionation of elemental chlorine in liquid hydrogen fluoride, thereby avoiding the use of expensive elemental fluorine. The selective fluorination process of this invention is particularly surprising and unexpected in view of the prior art which teaches that chlorine monofluoride adds to a wide variety of compounds, thereby acting as a chloro-fluorinating agent. For instance, U.S. Patent 3,035,893 discloses the preparation of sulfur chloride pentafluoride from sulfur tetrafluoride and chlorine monofluoride.

According to the process of this invention, the tetrafluorides and hexafluorides of sulfur, selenium and tellurium are provided by reacting chlorine monofluoride with a material selected from the group consisting of sulfur, selenium, tellurium, metal sulfides, metal selenides and metal tellurides. The hexafluorides of tungsten, molybdenum and uranium are provided by reacting chlorine monofluoride with a material selected from the group consisting of tungsten, molybdenum, uranium; the oxides of tungsten, molybdenum and uranium; the sulfides of tungsten, molybdenum and uranium; uranium carbides and salts containing the metallate anion of tungsten, molybdenum and uranium.

While any of the metals and metal compounds illustrated above can be utilized in the process of this invention, preferred embodiments employ sulfur, selenium, tellurium, the Group VI–B metal sulfides, molybdenum, tungsten, uranium, the oxides of molybdenum, tungsten and uranium, the alkali metal molybdates and tungstates, lead molybdate and lead tungstate in the reaction with chlorine monofluoride to provide the corresponding tetrafluorides and hexafluorides.

Illustrative of the Group VI–B sulfides are molybdenum disulfide, tungsten sulfide, and the uranium sulfides, for example, uranium disulfide and uranium sesquisulfide. These Group VI–B sulfides generally provide the hexafluorides of the Group VI–B element in addition to sulfur tetrafluoride and sulfur hexafluoride, and thus are particularly suitable for the simultaneous preparation of several of the compounds of this invention. Other suitable metal sulfides include the alkali metal sulfides, i.e., sodium sulfide, potassium sulfide, lithium sulfide and the like. Calcium sulfide, aluminum selenide and aluminum telluride are also useful in preparing the tetrafluorides and hexafluorides of this invention.

Molybdenum trioxide, tungstic oxide and the uranium oxides such as uranium dioxide, uranium trioxide and pitch-blend are illustrative of the oxides suitable for use in the preparation of the hexafluorides of molybdenum, tungsten and uranium. Exemplificative of salts of tungsten, molybdenum and uranium containing the respective metallate anions are the alkali metal molybdates, ammonium molybdate and lead molybdate; the alkali metal tungstates, calcium tungstate and lead tungstate; and uranous uranate. Minerals such as huebernite ($MnWO_4$), ferberite ($FeWO_4$), wolframite [$(Fe, Mn)WO_4$] and carnotite $K_2O \cdot 2VO_3 \cdot V_2O_5$, which contain metallate anions, also react readily with chlorine monofluoride to provide the desired tetrafluorides and hexafluorides.

The compounds of this invention are obtained at various temperatures within the range of about $-50°$ to about $600°$ C., depending on the particular tetrafluoride or hexafluoride being provided. Thus sulfur tetrafluoride is obtained from the reaction of chlorine monofluoride with sulfur or an appropriate sulfide at temperatures from about $-50°$ to $100°$ C. while the hexafluoride is obtained at temperatures above $100°$ C. The tetrafluorides of selenium and tellurium are provided over a temperature range of $-50°$ to $200°$ C., while the corresponding hexafluorides are obtained at temperatures above $200°$ C. Tungsten hexafluoride and molybdenum hexafluoride are formed at any temperatures within the broad range, while temperatures above about 75° C. provide uranium hexafluoride.

The process of this invention is carried out under substantially anhydrous conditions in a sealed reaction vessel. A wide range of pressures can be employed, but it is a feature of this invention that the process can be carried out advantageously around atmospheric pressure. The desired tetrafluorides and hexafluorides are easily isolated from the reaction mixture by conventional techniques such as vacuum distillation.

The tetrafluorides and hexafluorides provided by the process of this invention are known compounds having a wide variety of useful applications. Thus, the tetrafluorides of sulfur, selenium and tellurium are well-known specialized fluorinating agents in the field of organo-fluorine chemistry. Sulfur hexafluoride is a commercially available gaseous dielectric, commonly used in X-ray equipment, transformers, circuit breakers, wave guides and other electrical and electronic equipment, and tellurium hexafluoride possesses similar dielectric properties. The hexafluorides of tungsten and molybdenum can be reduced in a process for obtaining high purity metallic powder, while uranium hexafluoride is used for separating isotopes of uranium by a gas diffusion process and is also valuable as a medium for recovering uranium from nuclear fuel wastes.

The following examples will serve to illustrate the preparation of these tetrafluorides and hexafluorides in accordance with the process of this invention.

*Example 1*

A 150 cc. Monel cylinder was pacified with chlorine monofluoride and charged with 1.0 gram of pharmaceutical grade powdered sulfur. A Monel needle valve was attached and the cylinder evacuated on a copper-Monel vacuum line. Chlorine monofluoride was then introduced stepwise into the closed cylinder until a pressure of 1 atm. was observed.

Infrared analysis of a 200 mm. sample of the reaction products employing a 5 cm. Monel body cell with AgCl windows showed characteristic sulfur tetrafluoride bands at 7.80, 11.20, 11.40, 11.50, 13.55, 13.75 and 13.95$\mu$.

Additional chlorine monofluoride was pressured into the cylinder containing the sulfur tetrafluoride until a pressure of 5 p.s.i. was attained and the resulting gaseous mixture was heated at 200° C. in a fluidized sand bed for 2 hours. The cylinder was allowed to cool to room temperature and a 250 mm. sample of the product pressured into an infrared cell. Infrared analysis (250 mm. Hg) showed a characteristic sulfur hexafluoride band at 10.55$\mu$.

*Example 2*

Following the procedure of Example 1, chlorine monofluoride was added to 0.5 gram of metallic selenium powder at room temperature until the pressure of the system reached 1 atm.

Infrared analysis of 200 mm. sample of the gaseous product showed characteristic selenium tetrafluoride bands at 13.40 and 13.60$\mu$.

The chlorine was removed from the product by vacuum distillation at room temperature. Infrared analysis of the vapor (12 mm. Hg) above the liquid product revealed the selenium tetrafluoride bands at 13.40 and 13.60$\mu$.

*Example 3*

Chlorine monofluoride (1.0 gram) was reacted with powdered tungsten (1.0 gram) following the procedure described in Example 1.

The cylinder was cooled to −78° C. in a trichloroethylene-Dry Ice bath and a pressure of about 100 mm. Hg observed, corresponding to the vapor pressure of liquid chlorine at −78° C. Chlorine was removed by vacuum distillation and the cylinder allowed to warm to room temperature.

Infrared analysis of a sample of the product revealed the characteristic tungsten hexafluoride bands at 6.85, 7.35, 12.45, 14.00 and 14.10$\mu$.

*Example 4*

Chlorine monofluoride (1.5 grams) was reacted with powdered molybdenum (1.0 gram) following the procedure of the previous examples. Liquid chlorine was vacuum distilled from the reaction mixture at −78° C.

Infrared analysis of the remaining gaseous product showed molybdenum hexafluoride bands at 6.80, 7.25, 12.85, 13.10 and 13.50$\mu$.

*Example 5*

Chlorine monofluoride (2.0 grams) was reacted with tungsten trioxide (1.5 grams) following the procedure of Example 1. Chlorine and oxygen were distilled from the reaction mixture at −78° C. Infrared analysis of the product showed characteristic tungsten hexafluoride bands at 6.85, 7.35, 12.45, 14.00 and 14.10$\mu$.

*Example 6*

Following the procedure of Example 1, chlorine monofluoride (1.5 grams) was added to molybdenum disulfide (0.5 gram). Additional chlorine monofluoride was added until the pressure of the system increased to 5 p.s.i. After standing at room temperature for 1 hour, a 200 mm. sample of the reaction mixture was analyzed.

The infrared spectrum of the product showed characteristic molybdenum hexafluoride bands at 6.80, 7.25, 12.85, 13.10 and 13.50$\mu$ and a sulfur tetrafluoride band at 10.55$\mu$.

*Example 7*

Chlorine monofluoride (1.5 grams) was added to potassium molybdate (0.5 gram) utilizing the procedure of Example 1. The cylinder was suspended in a vertical electric furnace and heated at 300° C. for 2 hours. The cylinder was cooled in a trichloroethylene-Dry Ice bath and chlorine and unreacted chlorine monofluoride removed from the reaction mixture by vacuum distillation at −78° C. Infrared analysis of the remaining gaseous product showed molybdenum hexafluoride at 6.80, 7.25, 12.85, 13.10 and 13.50$\mu$.

The cylinder was evacuated of all gases and a white solid product remained. An aqueous solution of a sample of the solid product was titrated with 0.5 N NaOH for acidity. It was determined that the product contained 35.0 percent active fluorine, corresponding to $K_2MoF_8$, an expected by-product of the reaction. Thermal decomposition of this compound provides potassium fluoride and molybdenum hexafluoride, which are the normal decomposition products of $K_2MoF_8$.

*Example 8*

Chlorine monofluoride (2.0 grams) was added to sodium tungstate (0.5 gram) following the procedure of Example 1. The cylinder was suspended in a vertical electric furnace, heated to 300° C. for 2 hours, and then allowed to cool to room temperature.

Infrared analysis of a sample of the gaseous product showed characteristic tungsten hexafluoride bands at 6.85, 7.35, 12.45, 14.00 and 14.10$\mu$.

*Example 9*

Following the procedure of Example 1, chlorine monofluoride (1.0 gram) was added to lead tungstate (0.5 gram). After 1 hour, the system was pressured to 5 p.s.i. with chlorine monofluoride. The cylinder was suspended in a vertical electric furnace, heated at 300° C. for 2 hours, and then allowed to cool to room temperature.

The infrared spectrum of the gaseous product revealed tungsten hexafluoride bands at 6.85, 7.35, 12.45, 14.00 and 14.10$\mu$.

We claim:
1. A fluorination process for preparing the tetrafluorides of sulfur, selenium and tellurium which comprises reacting chlorine monofluoride with a material selected from the group consisting of sulfur, selenium, tellurium and metal sulfides under substantially anhydrous conditions at a temperature between about −50° and 200° C.

2. The process of claim 1 wherein sulfur tetrafluoride is provided by reacting sulfur with chlorine monofluoride.

3. The process of claim 1 wherein selenium tetrafluoride is provided by reacting selenium with chlorine monofluoride.

4. The process of claim 1 wherein sulfur tetrafluoride is provided by reacting a Group VI-B metal sulfide with chlorine monofluoride.

5. The process of claim 4 wherein molybdenum dissulfide is employed as the Group IV-B metal sulfide.

6. A fluorination process for preparing the hexafluorides of tungsten, molybdenum and uranium which comprises reacting chlorine monofluoride with a material selected from the group consisting of tungsten; molybdenum; uranium; the oxides of tungsten, molybdenum and uranium; the sulfides of tungsten, molybdenum and uranium; the alkali metal molybdates; the alkali metal tungstates; lead molybdate and lead tungstate under substantially anhydrous conditions at a temperature between about −50° and 600° C.

7. The process of claim 6 wherein tungsten hexafluoride is provided by reacting chlorine monofluoride with a material selected from the group consisting of tungsten, tungsten trioxide, the alkali metal tungstates and lead tungstate.

8. The process of claim 6 wherein molybdenum hexafluoride is provided by reacting chlorine monofluoride with a material selected from the group consisting of molybdenum, molybdenum disulfide and the alkali metal molybdates.

9. The process of claim 4 wherein a temperature between about −50° and 100° C. is employed.

References Cited
UNITED STATES PATENTS 3,035,890    5/1962    Roberts et al. _____ 23—367

CARL D. QUARFORTH, *Primary Examiner.*

L. DEWAYNE RUTLEDGE, *Examiner.*

S. TRAUB, R. L. GRUDZIECKI, *Assistant Examiners.*